April 7, 1936.  M. D. FITZGERALD  2,036,748
OIL EXCLUDING RING
Filed Nov. 18, 1933
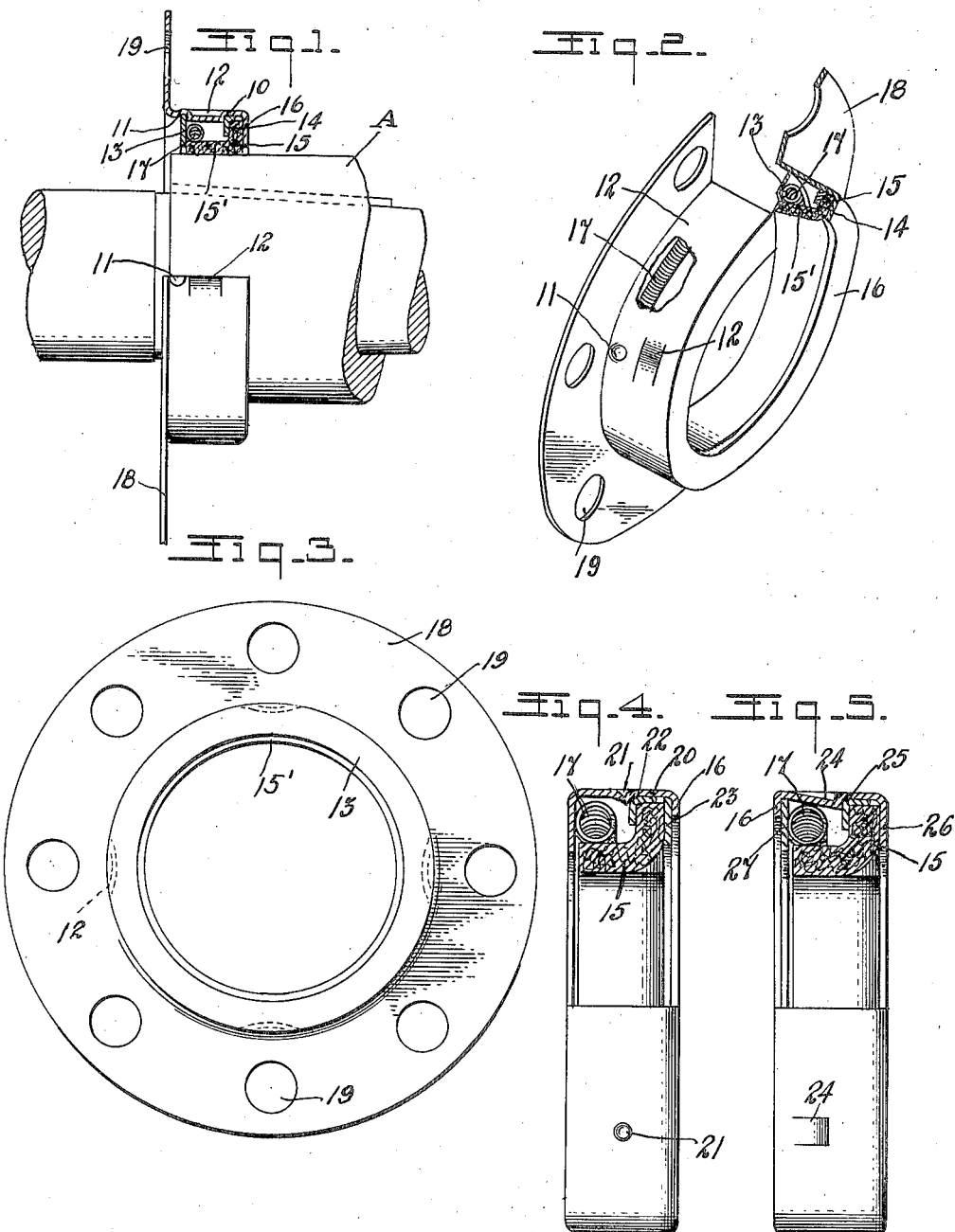
WITNESS:
INVENTOR
Martin D. Fitzgerald
BY
HIS ATTORNEY Patented Apr. 7, 1936

2,036,748

UNITED STATES PATENT OFFICE 2,036,748

OIL EXCLUDING RING

Martin D. Fitzgerald, Torrington, Conn., assignor to The Fitzgerald Manufacturing Company, Torrington, Conn., a corporation of Connecticut Application November 18, 1933, Serial No. 698,580

1 Claim. (Cl. 288—1)

This invention relates to oil excluding rings and has for an object to provide a ring of the type which embraces a rotating or reciprocating shaft to prevent the passage or seepage of oil.

A further object of the invention is to provide an oil excluding ring which may be economically manufactured, and which will operate to the maximum efficiency.

The invention, therefore, comprises a shell into which is inserted a packing element having a flange which is clamped within the shell and a section which forms a sleeve surrounding the shaft with a coiled spring engaging upon the exterior of the sleeve to hold it in oil excluding engagement with the shaft, and with improved means for putting together the shell and retaining parts and maintaining such parts in a unitary structure.

In the drawing,

Figure 1 is a view of one embodiment of the invention shown mounted in position upon a shaft, Figure 2 is a perspective view, parts being broken away to show the internal construction, Figure 3 is a view in side elevation of the type shown at Figure 1 or 2, Figure 4 is a view partly in edge elevation and partly in diametrical section showing a slightly modified type, and Figure 5 is a view partly in edge elevation and partly in diametrical section showing still a further modification.

Like characters of reference indicate corresponding parts throughout the several views.

The invention is adapted to be associated with a shaft either rotating or reciprocating, as indicated at A in Figure 1. While that figure indicates the shaft as rotating, it is to be understood that it will operate as efficiently with the reciprocating shaft. It comprises a shell 10 having a series of indentations 11 adjacent to the edge thereof, and a second series of indentations 12 spaced from the indentations 11 to provide space for receiving and positioning a plane annular washer 13.

An annular angle member 14 engages against the opposite sides of the indentations 12. A packing member 15 is seated in the angle member 14, and is clamped therein by peening down the edge of the shell as at 16. At this position the packing member forms a relatively plane annular flange, which is clamped as above noted, and is extended by a sleeve 15', which engages against the exterior of the shaft A, and is held in oil excluding relation by helical spring 17, which bears against the exterior of said sleeve, and is held in position by the washer 13.

In this type, a flange 18 is also provided with perforations 19 by which the device may be rigidly secured to any appropriate body. The flange 18, however, is largely an auxiliary and may be wholly omitted, as shown at Figures 4 and 5.

At Figure 4, for instance, the shell 20 is provided with a series of indentations 21 which are formed intermediate the edges and against this series of indentations an angle member 22 engages with the packing member 15 clamped between said angle member and the washer 23 which, in turn, is held by the edge 16 peened over upon such washer. A similar spring 17 is employed for similarly holding the sleeve of the packing member against the shaft. As shown at Figure 5, the indentations 24 are preferably inclined forming a shoulder against which the annular angle member 25 engages with the packing member 15 clamped against angle member by the annular flange 26 of the shell. In this instance, the edge of the shell is peened over at 16, against the washer 27. Of course, the usual spring 17 is employed for holding the sleeve of the packing member in operative relation.

In every embodiment the packing member is held by an angle annulus which in turn abuts against an indentation extending into the cylinder of the shell, and the said packing member is further held by engagement directly or indirectly with the side of the shell which forms an annular flange.

I claim:—

An oil excluding ring comprising a substantially cylindrical shell having indentations in its exterior forming protuberances in the interior of said cylinder, said indentations being formed in two circular series about said shell, whereby the protuberances are spaced apart in circumferential series, a washer mounted between said series of protuberances, an angle annulus bearing against one series of protuberances, a packing member formed as a relatively plane annular flange and as a relatively plane cylindrical sleeve, said annular flange being seated in the angle annulus, and an edge of said shell being turned down to clamp the packing member within said angle annulus.

MARTIN D. FITZGERALD.